United States Patent [19]

Ziegler et al.

[11] Patent Number: 5,519,838
[45] Date of Patent: May 21, 1996

[54] FAST PIPELINED DISTRIBUTED ARBITRATION SCHEME

[75] Inventors: Michael L. Ziegler, Whitinsville, Mass.; Robert J. Brooks, Roseville, Calif.; William R. Bryg, Saratoga, Calif.; Kenneth K. Chan, San Jose, Calif.; Thomas R. Hotchkiss, Groton, Mass.; Robert E. Naas, Fort Collins, Colo.; Robert D. Odineal, Roseville; Brendan A. Voge, Granite Bay, both of Calif.; James B. Williams, Lowell, Mass.; John L. Wood, Rochester, N.H.

[73] Assignee: Hewlett-Packard Company, Palo Alto, Calif.

[21] Appl. No.: 201,186

[22] Filed: Feb. 24, 1994

[51] Int. Cl.[6] ..................................................... G06F 13/00
[52] U.S. Cl. ............................................. 395/299; 395/300
[58] Field of Search .................................... 395/325, 299, 395/300

[56] References Cited

U.S. PATENT DOCUMENTS

| | | | |
|---|---|---|---|
| 4,511,959 | 4/1985 | Nicolas | 364/200 |
| 4,604,689 | 8/1986 | Burger | 364/200 |
| 4,641,266 | 2/1987 | Walsh | 364/200 |
| 4,745,548 | 5/1988 | Blahut | 364/200 |
| 5,111,424 | 5/1992 | Donaldson et al. | 395/725 |
| 5,193,194 | 3/1993 | Gruender, Jr. et al. | 395/725 |
| 5,195,185 | 3/1993 | Marenin | 395/325 |
| 5,261,109 | 11/1993 | Cadambi et al. | |
| 5,301,333 | 4/1994 | Lee | 395/725 |
| 5,317,696 | 5/1994 | Hilgendorf | 395/325 |

FOREIGN PATENT DOCUMENTS

| | | | |
|---|---|---|---|
| 0488711A2 | 11/1991 | European Pat. Off. | G06F 13/364 |
| WO86/03606 | 6/1986 | WIPO | G06F 9/64 |

*Primary Examiner*—Jack B. Harvey
*Assistant Examiner*—John Travis

[57] ABSTRACT

A bus system having a bus arbitration scheme. The bus system includes a bus and a plurality of client modules coupled to the bus. Each of the client modules is capable of transmitting information on the bus to another of client module, and only one client module is entitled to transmit information on the bus at any time. A module entitled to transmit information on the bus has control of the bus for a minimum period of time defining a cycle. To determine which module is entitled to use the bus, each client module generates an arbitration signal when it seeks to transmit information on the bus. Each client module has an arbitration signal processor responsive to the arbitration signals for determining whether the module is entitled to transmit information on said bus. The system preferably also contains a host module that informs the client modules what types of transactions allowed on the bus in a given cycle. Each arbitration signal processor preferably is also responsive to the client option signals sent by the host module during an earlier cycle.

6 Claims, 1 Drawing Sheet

FAST PIPELINED DISTRIBUTED ARBITRATION SCHEME

FIELD OF THE INVENTION

The present invention relates to buses, and more particularly to arbitration schemes for shared buses capable of carrying information among processors, memory, and input/output modules of a computer system.

BACKGROUND OF THE INVENTION

Computer systems commonly have a plurality of components, such as processors, memory, and input/output devices, and a shared bus for transferring information among two or more of the components. The components commonly are coupled to the bus in the form of component modules, each of which may contain one or more processors, memory, and/or input/output devices. Information is transmitted on the bus among component modules during bus "cycles," each bus cycle being a period of time during which a module has control of the bus and is permitted to transfer, or drive, a limited quantity of information on the bus.

A shared bus generally consists of sets of electrical paths (e.g., traces on a printed circuit board), each set being specialized for carrying a specific type of information. Each set of electrical paths (or hardware lines) is coupled to selected component modules that provide and/or utilize the information carried on that set of hardware lines. Buses commonly include one set of hardware lines for carrying data, one set for carrying the addresses identifying the data, and another set for carrying control signals allowing component modules to control the bus without conflict. The same set of hardware lines may be used for more than one purpose. For example, data and addresses may be carried sequentially on the same set of hardware lines. Specialized sets of hardware lines within a shared bus may also be referred to as buses. For example, a shared bus may contain a data bus, an address bus, and other buses.

Modules communicate with one another via a shared bus in the form of "transactions" taking one or more cycles to complete, such as "read" and "write" transactions. In a typical read transaction, a module will send information on the bus during one or more cycles identifying data that it needs to read from another module and requesting that the identified data be sent to it. The responding module then processes the request and returns the data.

In many conventional bus systems, the bus cannot be used for any other purpose between initiation of a read transaction and return of the requested data. If the latency time of the memory is several bus cycles, many bus cycles may be "wasted" in that no information is carried on the bus during the latency period. By contrast, in "split transaction" buses, a response need not immediately follow a request. For example, after a module initiates a read transaction, the module relinquishes control of the bus, and the bus can be used for any other purpose while the responding module processes the transaction. When the responding module is ready to return the requested data, it obtains control of the bus and sends the requested data to the requesting module. Thus, split transaction buses eliminate the need to "waste" bus cycles while requests are being processed. However, split transaction buses result in the need to arbitrate twice for every read transaction; once to obtain control of the bus for sending a read request and once to obtain control of the bus for returning the requested data.

Write transactions have smaller latency problems, because data is already in a fast memory that can be read-out at bus speed. In a typical "write" transaction, a module initiates a "write" by sending predetermined information on the bus during one or more cycles, and then immediately sends data to another module during succeeding cycles. Thus, no cycles are typically wasted in a write transaction, and write transactions need not be split. Hence, split transaction buses generally accommodate conventional (i.e., not split) write transactions along with split read transactions to relieve the need to arbitrate a second time.

Typically, only one module can send, or drive, information on a shared bus in a given cycle. Thus, any shared bus system must have a bus "arbitration" scheme for determining which module is entitled to drive information on the bus in a particular cycle. Many conventional bus arbitration schemes are available. In most arbitration schemes, each module in a shared bus system communicates that it wants to drive the bus, and an arbitration algorithm implemented on one or more processors determines which requesting module is entitled to drive the bus during a given cycle. There are two basic approaches to high performance bus arbitration: centralized arbitration and distributed arbitration.

In a centralized arbitration scheme, each module seeking to use the bus sends an arbitration signal to a central arbiter circuit. The central arbiter circuit processes the arbitration signals to determine the module entitled to use the bus during the next available cycle (i.e., the next bus owner). The central arbiter circuit then sends arbitration response signals back to the modules informing each module whether it is entitled to use the bus. The module that has "won" the arbitration then drives information on the bus. Because multiple communications are necessary during each arbitration, centralized arbitration typically has a undesirably long latency period between the time arbitration signals are sent and the time when the arbitration winner drives the bus.

In a distributed arbitration scheme, each module sends its arbitration signals to each other module in the system. Each module contains a logical circuit for executing an arbitration algorithm to determine the next bus owner based on these arbitration signals. Upon receiving the arbitration signals, each module determines the next bus owner. The module that has won the arbitration then drives its information on the bus. Distributed arbitration commonly has a shorter latency period than centralized arbitration, because only one communication is necessary during each arbitration. Distributed arbitration, however, is generally more costly than centralized arbitration because it requires separate logical circuits to execute an arbitration algorithm within each module, and also requires extra hardware lines for communicating arbitration signals from each module to each other module.

In addition to the above limitations, in most conventional and distributed arbitration schemes, bus cycles are often wasted in between transactions due to various inefficiencies in the schemes. For example, if a bus owner sends a transaction to a module that is too busy to handle it, the transaction will be aborted, wasting a cycle. Also, in arbitration schemes having a latency period between arbitration and control of the bus, cycles are often wasted during the latency period of an arbitration in circumstances where no module is permitted to drive the bus. Each of these problems results in reduced bandwidth.

A number of approaches have been used to improve or alter the performance characteristics of a bus. In some centralized and distributed arbitration buses, for example, the frequency at which data is sent on the bus can be increased by conventional pipelining, that is by having one or more stages of an arbitration for bus ownership during a future cycle occur during a cycle in which the current bus owner is driving data on the bus. Less bus time, therefore, is likely to be spent solely on arbitration and data can be sent over the bus at a higher rate. While this improves the rate of data transmission over the bus, it does not eliminate the above-discussed hardware efficiency problems of distributed buses or latency limitations of centralized buses. In other types of buses, arbitration signals are processed in the same cycle that they are sent, so that arbitration determines bus ownership for the immediately succeeding bus cycle. This approach minimizes the number of cycles between arbitration and bus control by the arbitration winner, but increases the minimum time period necessary during each cycle, thereby reducing the maximum bus frequency. A high frequency is generally desirable in that it generally allows for a higher bandwidth.

Accordingly, there is a need for a shared bus arbitration scheme having improvements over existing buses in terms of hardware efficiency, latency, maximum frequency and/or bandwidth.

SUMMARY OF THE INVENTION

An object of the present invention is, therefore, to provide an improved bus arbitration scheme.

Another object of the present invention is to provide a bus arbitration scheme that is efficient in terms of hardware.

Still another object of the present invention is to provide a bus arbitration scheme having a shorter latency than a centralized arbitration scheme.

Yet another object of the present invention is to provide a bus arbitration scheme that permits high frequencies and bandwidth.

These and other objects of the present invention will become apparent to those skilled in the art from the following detailed description of the invention and preferred embodiments, the accompanying drawings, and the appended claims.

Broadly stated, the present invention is a bus system having a pipelined bus arbitration scheme. The bus system includes a bus and a plurality of client modules coupled to the bus. Each of the client modules is capable of transmitting information on the bus to another of client module, and only one client module is entitled to transmit information on the bus at any time. A module entitled to transmit information on the bus has control of the bus for a minimum period of time defining a cycle.

To determine which module is entitled to use the bus, each client module generates an arbitration signal which it sends to other modules when it seeks to transmit information on the bus. Each client module has an arbitration signal processor responsive to the arbitration signals for determining whether the module is entitled to transmit information on said bus.

The system preferably also contains a host module that informs the client modules what types of transactions are allowed on the bus in a given cycle. Each arbitration signal processor preferably is also responsive to the client option signals sent by the host module during an earlier cycle.

The client modules preferably are divided into high priority modules and low priority modules. The high priority modules preferably are input/output modules and the low priority modules preferably are processor modules. Arbitration signals are sent from each client module to other client modules within its priority group. In addition, arbitration signals are sent from each input/output module to each processor module. However, because the input/output modules have a higher priority, there are no arbitration signals sent from the processor modules to the input/output modules.

Priority for use of the bus is preferably determined according to the following priority scheme, in descending order of priority: the current bus owner, the host module, the input/output modules, and the processor modules.

DETAILED DESCRIPTION OF THE PREFERRED EMBODIMENTS

Figure 1:
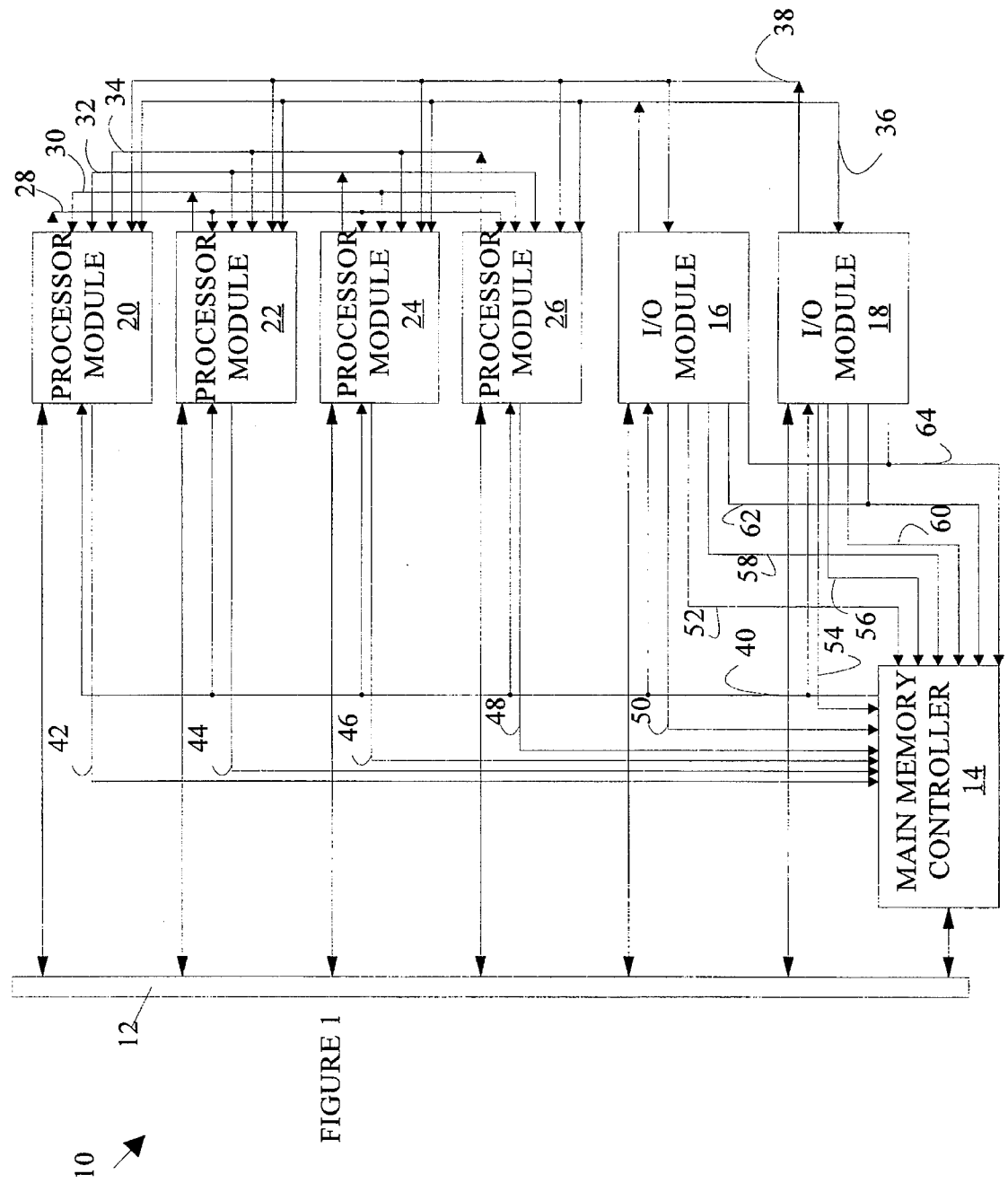
FIG. 1 is a block diagram illustrating one embodiment of a computer system utilizing an arbitration scheme according to the present invention.

The present invention encompasses an arbitration scheme for a high-performance shared bus. The arbitration scheme is described in the context of a computer system having a shared bus and a set of components modules that communicate with one another using the bus. The modules also arbitrate with each other for control of the bus.

The arbitration scheme is distributed: that is, each component module sends arbitration signals to other component modules and each module has a processor for determining whether it is the next bus owner. Arbitration conducted during a given cycle typically determines ownership of the bus two cycles in the future. The arbitration scheme is pipelined: that is, during any given bus cycle, t, an arbitration processor is computing the bus owner for t+1 based on arbitration signals received at t−1. In addition, the arbitration processor is sending and receiving the arbitration signals that will determine bus ownership at cycle t+2. At cycle t, the bus owner determined during cycle t−1 is driving the bus.

For purposes of arbitration in the preferred embodiment of the present invention one module serves as a "host" module and the remaining modules are considered "client" modules. During arbitration, the client modules send arbitration signals to other client modules indicating whether they are seeking control of the bus. The host module sends "client option" signals to the client modules indicating which types of transactions may be commenced during the next available bus cycle. Based on the client option signals and the arbitration signals, each module determines whether it is the next bus owner.

More specifically, the arbitration scheme involves three stages or "states," which are referred to as the arbitration state, the evaluation state, and the drive state. These three states preferably occur during three consecutive bus cycles. During the arbitration state, the host module sends client option signals to the client modules indicating the transaction types allowed in the next available cycle, and the client modules send arbitration signals to other client modules indicating whether they are seeking bus ownership for the next available cycle. During the evaluation state, each of the client modules and the host module evaluates the information available to it to determine whether it is the next bus owner. During the drive state, the module that has won the arbitration has control of the bus and may utilize the bus in accordance with the client option signals. The arbitration scheme is described in more detail below.

A block diagram of an exemplary computer system utilizing an arbitration scheme according to the present invention is shown at 10 in FIG. 1. Computer system 10 is a multiprocessor computer having a bus 12 and a plurality of components coupled to bus 12. The components include a main memory controller 14, input/output modules 16 and 18, and processor modules 20, 22, 24 and 26. Each component is separately coupled to bus 12 by sets of multiple hardware lines through which information is transferred. Main memory controller 14 is the "host" module, and the remaining components are "clients" of the bus, as described more fully below.

Processor modules 20, 22, 24 and 26 are the main processors for computer system 10, and software for the system executes simultaneously on all processors. Each processor module controls an arbitration signal transmission line (sometimes referred to herein as an ARB line), which couples it to the remaining processor modules. Processor modules 20, 22, 24 and 26 control arbitration signal transmission lines 28, 30, 32 and 34, respectively. When a processor wants to use bus 12, it sends a predetermined signal to the other processor modules on its ARB line. As noted above, ARB lines are generally used to arbitrate for control of bus 12 two cycles in the future.

Input/output modules 16 and 18 serve as interfaces between computer system 10 and input/output devices (not shown). Input/output modules 16 and 18 each contain an input/output adaptor. Each input/output module controls an arbitration signal transmission line, or ARB line, coupling it to the remaining input/output module and to each processor module. Input/output modules 16 and 18 control arbitration signal transmission lines 36 and 38, respectively. When an input/output module wants to use bus 12, it sends a predetermined signal to the remaining client modules on its ARB line.

Main memory controller 14 is responsible for reading information from the main memory (not shown) and storing information in the main memory in a conventional manner. Main memory controller 14 interfaces with memory either directly or through a conventional bus. As noted above, main memory controller 14 preferably also serves as the host module for purposes of bus control and, as will be explained in more detail below, main memory controller 14 has the highest priority access to the bus. Main memory controller 14 controls a CLIENT_OP line 40, which is coupled directly to each client module. Main memory controller 14 sends signals to each client module on CLIENT_OP line 40 to indicate what types of transactions may be placed on bus 12 during the next available cycle. CLIENT_OP signals generally relate to the state of bus 12 two cycles in the future (i.e., the cycle for which arbitration is being conducted).

As shown in FIG. 1, main memory controller 14 does not receive arbitration signals from any client module, and the input/output modules do not receive arbitration signals from the processor modules. As explained further below, the host (main memory controller) has higher priority access to the bus than any client module and the input/output modules have higher priority access to the bus than the processor modules. Using an arbitration scheme according to the present invention, each module generally can determine whether it is entitled to use the bus without considering arbitration signals from lower priority modules. The host asserts its priority through the CLIENT_OP lines.

Before discussing the arbitration process in detail, Bus 12 will be briefly described. Bus 12 is a high performance processor-memory-I/O interconnect bus. Bus 12 is a split transaction bus. For example, after a READ transaction is issued on bus 12, the module that issued the READ relinquishes the bus allowing other modules to use the bus for other transactions. When the requested data is available, the responding module for the READ arbitrates for the bus, and then transmits the data. WRITE transactions are not split, so the master transmits the WRITE data immediately following the address cycle.

Bus 12 preferably includes at least three buses that are primarily related to data transmission: an ADDR_DATA bus, a MASTER_ID bus, and a TRANS_ID bus. Bus 12 also includes a LONG_TRANS bus, which is related to arbitration for control of bus 12.

The ADDR_DATA bus is used for transmission of address information and data. Cycles where the ADDR_DATA bus carries address-related information are referred to as address cycles and cycles where the ADDR_DATA bus carries data is referred to as data cycles. Write transactions, for example, generally have a single address cycle followed immediately by one or more data cycles. The bus owner initiates a write transaction indicating the address to which it desires to write data and sends data during the succeeding cycles. Read transactions generally have a single address cycle used by the bus owner to indicate the address sought to be read. This address cycle is followed at some later time by one or more data cycles in which data is sent to the requesting module by the module responding to the request. Idle cycles may also occur in which no address-related information or data is sent.

The MASTER_ID and TRANS_ID buses are used together so that return data for a split transaction can be uniquely associated with the original transaction. Each split transaction is identified by a MASTER_ID signal on the MASTER_ID bus and a TRANS_ID signal on the TRANS_ID bus that, respectively, identify the module issuing the transaction and distinguish the transaction from other transactions sent by that module. For example, a split transaction "read" is sent with a unique combination of a MASTER_ID signal and a TRANS_ID signal. The MASTER_ID and TRANS_ID then accompany the return of the requested data, so that the returned data is received by the requesting module and correlated with the appropriate transaction. This mechanism allows transaction returns to come back in an order other than the order in which they were issued, because the transaction order is not critical to identification of transactions. To allow unique identification, only one transaction with a given transaction ID may be outstanding from a module at a given time. The same transaction ID may, however, be used by two or more separate modules simultaneously, since the transaction can be differentiated by the MASTER_ID.

LONG_TRANS is used by the current bus owner to retain control of bus 12 until a long transaction is completed. For example, a module may need to write a large amount of data during a series of cycles. When LONG_TRANS is asserted, other transactions cannot be inserted into the middle of the data by higher priority clients or the host, as explained further below.

Turning now to the process of arbitrating for bus 12, the arbitration process involves three states: the arbitration state, the evaluation state, and the drive state. During the arbitration state, all client modules actively drive their ARB lines, the host module drives the CLIENT_OP bus, and the current bus owner drives LONG_TRANS. During the evaluation state, each of the clients and the host evaluates the ARB, CLIENT_OP, and LONG_TRANS signals to determine whether it will drive the next available bus cycle. During the drive state, after arbitration is effectively completed, the module that has won arbitration drives the bus. The three states relating to control of bus 12 at a given bus cycle preferably occur during three consecutive bus cycles.

Arbitration preferably is pipelined. During a given cycle, three operations are being accomplished. First, the current bus owner is driving bus 12. Second, the clients are evaluating the arbitration-related signals sent during the previous cycle (t−1) to determine the bus owner during the next cycle (t+1). Finally, arbitration-related signals are being driven on the ARB lines, CLIENT_OP bus, and LONG_TRANS bus to determine the bus owner two cycles in the future (t+2).

Ownership of bus 12 at cycle t+2 is determined according to the following four-tier priority scheme, from highest to lowest priority: (1) current bus owner; (2) main memory controller 14; (3) input/output modules 16 and 18; and (4) processor modules 20, 22, 24 and 26. When two or more modules having the same priority are arbitrating for control of the bus, any conventional arbitration protocol may be used to determine which one becomes bus owner. For example, a conventional round robin protocol may be used in which the modules effectively wait in a queue to obtain bus access, and the module that most recently controlled the bus is moved to the end of the queue.

With respect to the arbitration protocol for choosing among modules having the same priority, a module that wins arbitration preferably wins the right to control the bus for at least two consecutive cycles before another same-priority module can win control of the bus. This accounts for the two cycle delay between arbitration and bus ownership, allowing the winning module to assert LONG_TRANS, if necessary, before another same-priority module has been granted control of the bus. In some embodiments, modules automatically win for at least two cycles when only same-priority modules are arbitrating. In other embodiments, a module wins the bus for a single cycle and is given preference over other same-priority modules during the next available cycle, permitting the module to win the second cycle if the module arbitrates for that cycle.

The current bus owner has the highest priority for using the bus to allow for efficient transmission of long transactions; that is, so the bus owner does not have to give up control of the bus in the middle of a transaction and then arbitrate for control of the bus to complete the transaction at a later time. If the current bus owner during the arbitration state asserts LONG_TRANS, the current owner will win arbitration, and will be entitled to drive the bus again in the drive state phase. A bus owner transmitting a many-cycle transaction must assert LONG_TRANS during all cycles except the last two cycles of the many-cycle transaction. It is not necessary to assert LONG_TRANS during the last two cycles because of the delay between the arbitration state and the drive state. At the end of the transaction, the module must de-assert LONG_TRANS, so that other modules can successfully arbitrate. Since the host has control of the CLIENT_OP bus, it does not need to use LONG_TRANS in order to retain control of bus 12 because it can send a CLIENT_OP signal that disallows new transactions by the clients, as explained further below. Therefore, when the host has control of bus 12, it de-asserts LONG_TRANS.

The host module has the second highest priority for using the bus. The CLIENT_OP bus is used by the host module both to tell the client modules what types of transactions are allowed during the next available bus cycle and to take control of the bus for itself by disallowing starting new transactions.

In a preferred embodiment, the CLIENT_OP bus supports the signals shown in Table 1.

TABLE 1

| Name | Value | Meaning |
| --- | --- | --- |
| SHAR_RTN | 000 | Host controls bus 12 for shared return at t + 2 |
| HOST_CONTROL | 001 | Host controls bus 12 at t + 2 |
| NONE_ALLOWED | 010 | No trans allowed at t + 2, but clients still control bus 12. |
| ONE_CYCLE | 011 | One cycle trans allowed at t + 2 |
| RET_ONLY | 100 | Return or response trans allowed at t + 2 |
| NO_IO | 101 | Any except I/O trans allowed at t + 2 |
| ATOMIC | 110 | Client who is "atomic owner" can issue any transaction, other clients can issue only responses, at t + 2. |
| ANY_TRANS | 111 | Any transaction allowed at t + 2 |

The CLIENT_OP signals relating directly to obtaining control of the bus are explained below and are important within the arbitration scheme of the present invention. The other CLIENT_OP signals from Table 1 are not critical to the bus arbitration scheme of computer system 10 and are included, for illustrative purposes, to show one way that the CLIENT_OP bus can be used to limit the transactions allowed during a given cycle. These other CLIENT_OP signals will be briefly explained as well.

The ANY_TRANS and HOST_CONTROL client option signals are relatively straightforward. A CLIENT_OP of ANY_TRANS indicates that any transaction is allowed during cycle t+2. A CLIENT_OP of HOST_CONTROL indicates that the host seeks control of the bus at t+2.

The ONE_CYCLE client option signal is used primarily for ownership changeover from the clients to the host. If the CLIENT_OP is ONE_CYCLE, only one-cycle transactions are allowed at cycle t+2. In a typical case, when the host seeks control of bus 12, it issues ONE_CYCLE then HOST_CONTROL during consecutive cycles. The ONE_CYCLE client option signal prevents any client from asserting LONG_TRANS during the cycle immediately preceding the cycle for which the host seeks control.

The ONE_CYCLE signal is necessary because of the delay, described above, between the arbitration state and the drive state of the present arbitration scheme. The host module does not know during a cycle t which client will control the bus during the cycle t+1, or whether that client will assert LONG_TRANS. If a client were permitted to assert LONG_TRANS during cycle t+1, the host would not be able to evaluate this information in time to avoid a conflicting claim for bus ownership at cycle t+2 between the host and the client asserting LONG_TRANS. Thus, the host sends a ONE_CYCLE signal during cycle t−1, thereby preventing the bus owner at cycle t+1 from asserting LONG_TRANS. Of course, LONG_TRANS may be asserted at cycle t. However, if LONG_TRANS is asserted at cycle t, the host will be able to process this information in time to know that it cannot drive the bus at t+2.

Assuming the current bus owner is not asserting LONG_TRANS and the host module is driving a client option signal that allows for any client to control the bus, and no input/output module is arbitrating for the bus, a processor module will win arbitration. The winner is allowed to initiate any transaction or return allowed based on the CLIENT_OP. If the transaction is three or more cycles, the new owner must assert LONG_TRANS to retain ownership of the bus for the duration of the transaction. Of course, the winner is allowed to drive an idle cycle in lieu of starting a new transaction. This may be necessary, for example, if the new owner needs to send a long transaction and the CLIENT_OP is ONE_CYCLE.

High priority modules must arbitrate for an extra cycle in order to win arbitration to allow for the fact that high priority modules do not receive arbitration signals from low priority modules. In the first cycle that a high priority module is arbitrating, (assuming LONG_TRANS is not asserted and client control is allowed), a processor module will still win arbitration. The processor module can then start a new transaction, as allowed by CLIENT_OP, with the added restriction that it can only be a single cycle transaction. Thus, the "effective" CLIENT_OP is ONE_CYCLE, as far as the processor modules are concerned. This transition method prevents a processor module from asserting a LONG_TRANS during cycle t+1.

In the second cycle that a high-priority module arbitrates, it will win arbitration, assuming that neither the host module nor the current bus owner is entitled to control the bus during the next available cycle. If more than one input/output module is arbitrating, a conventional arbitration protocol (such as a round robin protocol) is used to determine which module wins. The winning input/output module can initiate any transaction or return allowed based on the CLIENT_OP encoding and may assert LONG_TRANS in the manner described above for processor clients.

As described above, when only processor modules are arbitrating, a processor module will win the arbitration and drive bus 12. If no clients are arbitrating, and the host is granting bus 12 to the clients, a processor module will nevertheless win the arbitration and drive bus 12, typically with an idle cycle.

Table 2, below, illustrates the arbitration process during an exemplary series of 10 consecutive bus cycles. The first column of Table 2 lists cycles 1–10. In the remaining columns of Table 2, Table 2 shows the signals being driven on the CLIENT_OP bus, the LONG_TRANS bus, the Processor Module ARB Lines, and the input/output Module ARB Lines during each cycle. The final column of Table 2 lists the current bus owner during each of the ten cycles. A "1" in the LONG_TRANS or ARB line columns indicates, respectively, that LONG_TRANS is being asserted or that the module controlling the indicated ARB line is seeking bus ownership during the next available bus cycle.

As shown in Table 2, during cycle 1, processor module 20 owns bus 12 and is not asserting LONG_TRANS. Processor modules 24 and 26 are each arbitrating for control of bus 12 by asserting ARB lines 32 and 34, respectively. The HOST issues an ANY_TRANS client option signal, and no input/output modules are arbitrating for control of bus 12. The signals sent during cycle 1 are evaluated during cycle 2 and, based on these signals, processor module 24 becomes the bus owner during cycle 3, the next available bus cycle.

During cycle 2, nearly identical signals are sent, except that the host issues a ONE_CYCLE client option signal. Thus, processor module 24 also wins control of the bus for cycle 4.

During cycles 3–6, processor module 24 asserts LONG_TRANS. Thus, processor module 24 retains control of bus 12 from cycle 3 through cycle 8.

Arbitration during cycle 7 determines bus ownership during cycle 9. Since processor module 24 is not asserting LONG_TRANS during cycle 7 and since the host is asserting HOST_CONTROL, the host wins arbitration and controls bus 12 during cycle 9. By continuing to assert HOST_CONTROL during cycle 8, the host retains control of bus 12 during cycle 10.

Other exemplary client option signals shown in Table 1 will now be described briefly. Several of the CLIENT_OP signals relate to input/output modules 16 and 18. As shown in FIG. 1, input/output modules 16 and 18 preferably control STOP_IO lines 58 and 60, respectively, for sending signals to memory controller 14 indicating that the modules cannot accept any more input/output transactions. Input/output modules 16 and 18 also preferably control STOP_MOST lines 62 and 64, respectively, for sending signals to memory controller 14 and to each other to take effective control of the memory system.

The STOP_IO lines are used by each input/output module to inform the host when an input/output module is incapable of responding to new input/output transactions. Using the STOP_IO lines, the input/output module informs the host, who in turn issues only CLIENT_OPs that disallow new I/O transactions.

Thus, if an input/output module is busy, it asserts its STOP_IO line. The host will then assert a NO_IO signal. If the CLIENT_OP is NO_IO, all transactions except I/O transactions are allowed.

The RET_ONLY client option signal indicates that only returns (write-backs) of previously held private-dirty cache lines, or responses to previous transactions are allowed. For example, if processor 24 issues a coherent read of a cache

TABLE 2

| Cycle | CLIENT_OP | LONG_TRANS | Processor Module ARB Lines 28/30/32/34 | Output/Input Module ARB Lines 36/38 | Owner |
|---|---|---|---|---|---|
| 1 | ANY_TRANS | 0 | 0/0/1/1 | 0/0 | Module 20 |
| 2 | ONE_CYCLE | 0 | 0/0/1/1 | 0/0 | Module 20 |
| 3 | HOST_CONTROL | 1 | 0/0/0/1 | 0/0 | Module 24 |
| 4 | HOST_CONTROL | 1 | 0/0/0/1 | 0/0 | Module 24 |
| 5 | HOST_CONTROL | 1 | 0/0/0/1 | 0/0 | Module 24 |
| 6 | HOST_CONTROL | 1 | 0/0/0/1 | 0/0 | Module 24 |
| 7 | HOST_CONTROL | 0 | 0/0/0/1 | 0/0 | Module 24 |
| 8 | HOST_CONTROL | 0 | 0/0/0/1 | 0/0 | Module 24 |
| 9 | HOST_CONTROL | 0 | 0/0/0/1 | 0/0 | HOST |
| 10 | HOST_CONTROL | 0 | 0/0/0/1 | 0/0 | HOST | line that is private-dirty in processor 20's cache, processor 20 can supply that cache line in a cache-to-cache copy. That cache-to-cache copy transaction can be initiated under the influence of a RET_ONLY client option signal, since the cache-to-cache copy is a response to the coherent read. Similarly, I/O module 16 can return data from an earlier I/O read transaction under the influence of a RET_ONLY client option signal, since the data return is a response to the I/O read transaction.

The STOP_MOST lines are used to grab effective control of the memory system. This is useful, for example, when several memory operations must be performed by a module without other modules reading data from or writing data to relevant memory addresses. When an input/output module asserts STOP_MOST, it becomes "atomic owner," and only the atomic owner is allowed to issue new transactions. Other modules are allowed to issue only return or response-type transactions. If more than one input/output module simultaneously asserts STOP_MOST, any conventional arbitration algorithm may be used to determine which input/output module becomes atomic owner. It will be appreciated by those skilled in the art that the STOP_MOST lines and STOP_MOST signals are not necessary to the present invention.

The ATOMIC CLIENT_OP is generated in direct response to a client asserting STOP_MOST, assuming flow control would normally allow ANY_TRANS. The ATOMIC CLIENT_OP allows the client asserting STOP_MOST to perform several consecutive transactions on bus 12. All other clients are only allowed to respond to earlier sent transactions, or write-backs of previously held private-dirty cache lines, if they obtain the bus during any cycle in which ATOMIC is asserted. The host may also ordinarily limit all clients to response-type transactions using the RET_ONLY client option signal. Thus, when there is an atomic owner, the effective client option signal for the atomic owner is ANY_TRANS and the effective client option signal for all other clients is RET_ONLY.

The NONE_ALLOWED client option signal is used to indicate that no transaction are allowed at cycle t+2. NONE_ALLOWED may also be used for ownership changeover after a RET_ONLY, in a manner similar to the use of a ONE_CYCLE client option signal. The typical case would be for the host to issue RET_ONLY, NONE_ALLOWED, then HOST_CONTROL on subsequent cycles, for the host to get control of bus 12.

While not necessary to the above described arbitration scheme, any or all client modules (both processor and input/output) may have a conventional cache memory. As is well known in the art, computer systems may have multiple processor modules having cache memories for storing frequently used data and a shared main memory used by all of the processors. The cache memory typically stores both frequently used data and the addresses where these data items are stored in main memory. When the processor seeks data from an address in memory, it requests that data from its cache memory using the address for the data. Its cache memory checks to see whether it holds that address and, if so, the data is returned directly to the processor. If the cache memory does not contain the desired information, a regular memory access occurs. Cache memory is typically useful when main memory (generally RAM) accesses are slow compared to the microprocessor speed.

It is generally necessary for software executing on the processors to utilize the most current values for data stored at particular addresses. In a shared memory multi-processor computer such as computer system 10, where each processor has cache memory, the most current data may be stored in one or more cache memories or in the main memory. Thus, whenever a processor seeks data that may have been used by other processors it is necessary to implement a "coherency scheme" to make certain that the data available to the processor is current. In a typical coherency scheme, each module performs a coherency check of its cache memory to determine whether it has data associated with the requested address and reports the results of its coherency check. The results of the coherency checks performed by each module are analyzed and the most current data is used by the module that requested the data.

In the case of computer system 10, each module having a cache memory controls at least one coherent transaction signal transmission line (i.e., a COH lines) for sending signals directly to memory controller 14 that allow memory controller 14 to coordinate transactions involving reads or writes of data that may be stored in one or more cache memories. Such transactions are referred to as coherent transactions. Coherent transactions may be coordinated in any manner conventional to multiprocessor computers. Processor modules 20, 22, 24 and 26 control COH lines 42, 44, 46 and 48, respectively. Input/output modules 16 and 18 control COH lines 50 and 54, respectively.

In the preferred embodiment shown in FIG. 1, input/output modules 16 and 18 each contain two separate input/output adapters that have separate cache memories. Thus, in addition to controlling COH lines 50 and 54, input/output modules 16 and 18 also control COH lines 52 and 56, such that each input/output adapter controls a separate COH line.

The CLIENT_OP bus can be used to transmit the coherency status relating to a particular transaction back to the module requesting the data. The host uses the SHAR_RTN client option signal to arbitrate for any data return with a conventional shared coherency status. Otherwise, client modules preferably assume that a read return has conventional private status.

It will be appreciated by those skilled in the art that memory controller 14 serves as the host for convenience only, and that host functions and memory control functions may be separated into two or more modules.

The terms "bus(es)" and "line(s)" have both been used in this detailed description to denote various sets of one or more electrical paths that are more fully described above. It will be appreciated by those skilled in the art that the terms "bus" and "line" are not intended to be mutually exclusive or otherwise limiting in themselves. For example, while the term "LONG_TRANS bus" has been used, it is clear that the LONG_TRANS bus may consist of a conventional shared line; that is, a single electrical path along which signals can be sent by more than one module. Similarly, the terms "CLIENT_OP bus" and "CLIENT_OP lines" have been used interchangeably to denote a set of hardware lines driven only by the host, as described more fully above.

Various modifications to the present invention will become apparent to those skilled in the art from the foregoing description and accompanying drawings. Accordingly, the present invention is to be limited solely by the scope of the following claims.

What is claimed is:

1. A bus system having a bus arbitration scheme, comprising:

a bus;

a plurality of modules coupled to said bus, said modules comprising a plurality of priority classes, at least one of said classes having at least two modules belonging thereto, each of said modules being capable of transmitting information on said bus to another of said modules, only one of said modules being entitled to transmit information on said bus at any given time, each of said modules generating an arbitration signal which is communicated to all modules of its priority class and all modules of a lower priority class when said module seeks to transmit information on said bus, wherein said priority classes are ranked, modules belonging to a priority class having a higher ranking being given access to said bus over modules belonging to a class having a lower ranking;

wherein a module that is entitled to transmit information on said bus at any given time has control of said bus for a minimum period of time defining a cycle; and wherein each of said modules has an arbitration signal processor, responsive to at least one of said arbitration signals, for determining whether said module is entitled to transmit information on said bus during a selected future cycle.

2. The bus system of claim 1, wherein each said module sends arbitration signals only to each other said module in its priority class and each other said module in a priority class having priority lower than its priority class.

3. The bus system of claim 1, wherein a module that is entitled to transmit information on said bus controls a long transaction line for sending a long transaction signal to each of said modules, wherein said arbitration signal processors are further responsive to said long transaction signal.

4. The bus system of claim 1, wherein information is transmitted on said bus during a selected cycle, and during said selected cycle each arbitration signal processor determines whether a module is entitled to transmit information on said bus during a first selected future cycle, and during said selected cycle arbitration signals are generated that determine which module is entitled to transmit information on said bus during a second selected future cycle.

5. A bus system having a bus arbitration scheme, comprising:

a bus;

a plurality of modules coupled to said bus, said modules comprising a plurality of priority classes, each of said modules being capable of transmitting information on said bus to another of said modules, only one of said modules being entitled to transmit information on said bus at any given time, each of said modules generating an arbitration signal which is communicated to all modules of its priority class and all modules of a lower priority class when said module seeks to transmit information on said bus;

wherein a module that is entitled to transmit information on said bus at any given time has control of said bus for a minimum period of time defining a cycle; and wherein each of said modules has an arbitration signal processor, responsive to at least one of said arbitration signals, for determining whether said module is entitled to transmit information on said bus during a selected future cycle, wherein one of said priority classes comprises a host module, said host module having the highest priority, said host module controlling a client option line for sending a client option signal to each of said modules, wherein said arbitration signal processors are further responsive to said client option signals to determine the type of transaction that may be placed on said bus at the next available bus cycle.

6. The bus system of claim 5, wherein information is transmitted on said bus during a selected cycle, and during said selected cycle each arbitration signal processor determines whether a module is entitled to transmit information on said bus during a first selected future cycle, and during said selected cycle arbitration signals are generated that determine which module is entitled to transmit information on said bus during a second selected future cycle.

* * * * *